(12) United States Patent
Reif

(10) Patent No.: US 10,947,770 B2
(45) Date of Patent: Mar. 16, 2021

(54) ADJUSTING DEVICE FOR A VEHICLE PART THAT IS MOVABLE RELATIVE TO A BODY OF A VEHICLE

(71) Applicant: Stabilus GmbH, Koblenz (DE)

(72) Inventor: Thomas Reif, Kobern-Gondorf (DE)

(73) Assignee: Stabilus GmbH, Koblenz (DE)

( * ) Notice: Subject to any disclaimer, the term of this patent is extended or adjusted under 35 U.S.C. 154(b) by 149 days.

(21) Appl. No.: 15/840,518

(22) Filed: Dec. 13, 2017

(65) Prior Publication Data

US 2018/0163452 A1    Jun. 14, 2018

(30) Foreign Application Priority Data

Dec. 14, 2016    (DE) ..................... 10 2016 224 968.1

(51) Int. Cl.
| | | |
|---|---|---|
| *E05F 15/622* | (2015.01) | |
| *F16H 25/20* | (2006.01) | |
| *B60J 5/00* | (2006.01) | |

(52) U.S. Cl.
CPC ........... *E05F 15/622* (2015.01); *F16H 25/20* (2013.01); *B60J 5/00* (2013.01); *E05Y 2900/531* (2013.01);
(Continued)

(58) Field of Classification Search
CPC .................. E05F 15/622; F16H 25/20; F16H 2025/2043; B60J 5/00; B60J 5/047;
(Continued)

(56) References Cited

U.S. PATENT DOCUMENTS

| | | | |
|---|---|---|---|
| 6,382,706 B2 * | 5/2002 | Yuge | ........................ B60J 5/106 296/106 |
| 10,041,281 B1 * | 8/2018 | Miu | ...................... E05F 15/622 |

(Continued)

FOREIGN PATENT DOCUMENTS

| | | | | |
|---|---|---|---|---|
| DE | 11 2012 003 117 | | 4/2014 | |
| DE | 102013214733 A1 * | | 1/2015 | .............. F16C 11/02 |

(Continued)

OTHER PUBLICATIONS

Search Report for German patent application No. 10 2016 224 968.1 dated Jul. 14, 2017, 8 pages.
(Continued)

*Primary Examiner* — Jake Cook
*Assistant Examiner* — T. Scott Fix
(74) *Attorney, Agent, or Firm* — Rankin, Hill & Clark LLP

(57) ABSTRACT

An adjusting device for a vehicle part that is movable relative to the body of a vehicle, in particular for a vehicle door or panel, includes a drive assembly having a drive unit and a connecting unit for connecting the drive assembly to a superordinate assembly, i.e. an assembly not part of the adjusting device, either the body of the vehicle or the movable vehicle part, an adjusting element which can be displaced relative to the drive assembly by means of the drive unit and which comprises, at the free end thereof, an additional connecting unit for connecting the adjusting element to a superordinate assembly, i.e. an assembly not part of the adjusting device, either the movable vehicle part or the body of the vehicle, one connecting unit is connected to the drive assembly at a point that is remote from the free end of the drive assembly.

7 Claims, 4 Drawing Sheets

(52) U.S. Cl.
CPC . *E05Y 2900/546* (2013.01); *F16H 2025/2043* (2013.01)

(58) Field of Classification Search
CPC ........ B60J 5/0472; B60J 5/0473; B60J 5/106; E05Y 2900/531; E05Y 2900/546
USPC ..................................................... 74/424.71
See application file for complete search history.

(56) References Cited

U.S. PATENT DOCUMENTS

| | | | | |
|---|---|---|---|---|
| 2004/0187263 | A1* | 9/2004 | Hoffman | B60J 5/0472 16/367 |
| 2007/0261310 | A1* | 11/2007 | Porat | E05F 1/1091 49/340 |
| 2009/0051192 | A1* | 2/2009 | Ewing | E05F 15/622 296/146.2 |
| 2011/0061481 | A1* | 3/2011 | Zimmermann | F16H 25/24 74/89.23 |
| 2013/0074412 | A1* | 3/2013 | Wellborn | E05C 17/203 49/381 |
| 2014/0150581 | A1* | 6/2014 | Scheuring | B60J 5/047 74/89.38 |
| 2014/0298980 | A1* | 10/2014 | Cyren | F16H 25/2015 91/41 |
| 2015/0176322 | A1* | 6/2015 | Wuerstlein | B60J 5/047 701/49 |
| 2016/0052375 | A1 | 2/2016 | Scheuring et al. | |

FOREIGN PATENT DOCUMENTS

| | | |
|---|---|---|
| EP | 0 463 452 | 1/1992 |
| EP | 2669458 A2 | 12/2013 |

OTHER PUBLICATIONS

Extended European Search Report of EP Serial No. 17206944.5 dated Apr. 18, 2018, 7 pages.

* cited by examiner

ADJUSTING DEVICE FOR A VEHICLE PART THAT IS MOVABLE RELATIVE TO A BODY OF A VEHICLE

The invention relates to an adjusting device for a vehicle part that is movable relative to a body of a vehicle, in particular for a vehicle door or a vehicle panel, comprising a drive assembly having a drive unit and a connecting unit which is designed to connect the drive assembly to a superordinate assembly, i.e. an assembly that is not part of the adjusting device, namely either the body of the vehicle or a movable vehicle part, and an adjusting element which can be displaced relative to the drive assembly by means of the drive unit and which comprises, at the free end thereof, an additional connecting unit which is designed to connect the adjusting element to a superordinate assembly, i.e. an assembly that is not part of the adjusting device, namely either the movable vehicle part or the body of the vehicle.

Adjusting devices of the type mentioned at the outset are generally known from the prior art, for example in the form of spindle drives that are used for opening and closing vehicle doors or vehicle panels, for example boot lids, engine compartment lids, tailgates or the like. In the case of these adjusting devices, the two connecting units, formed by ball sockets for example, are usually each arranged at the free end of the adjusting element and the drive assembly, i.e. at positions that are furthest from the point at which the drive assembly interacts with the adjusting element for adjusting said element or at which the adjusting element emerges from the drive assembly. A disadvantage here is that these connecting points that are provided for connecting to the vehicle body or the movable vehicle part often do not match the coupling points provided by the designer of the automobile on the vehicle body or the movable vehicle part, and therefore complex adapter constructions are necessary, for example using additional panels having greater rigidity. These additional adapter constructions are not only expensive, but also take up valuable installation space.

The object of the present invention is therefore to provide a remedy for this problem.

This object is achieved according to the invention by an adjusting device of the type mentioned at the outset, in which one connecting unit is connected to the drive assembly at a point that is remote from the free end of the drive assembly.

The adjusting device according to the invention has the advantage that the distance between the two connecting units is shorter than the overall length of said units, as, unlike in conventional adjusting devices, the overall length of the adjusting device does not extend between the two connecting units. The position of one connecting unit on the drive unit may be selected arbitrarily in accordance with the assembly designer's specifications. It is thus possible to dispense with additional components, for example support plates.

At this point it should be noted that the adjusting device according to the invention can also be used as a movable vehicle part for opening and closing vehicle doors or vehicle panels, for example boot lids, engine compartment lids, tailgates or the like.

Advantageously, one connecting unit can be arranged at the end of the drive assembly at which said drive assembly interacts with the adjusting element or at which the adjusting element emerges from the drive assembly. In this way, it is possible to position the two connecting units, i.e. one connecting unit and the additional connecting unit, at a minimum distance from one another.

In a development of the adjusting device according to the invention, the pivot axis of one connecting unit can extend so as to be skewed relative to the adjustment axis of the adjusting element. This can be implemented by a connecting unit for example, the pivot axis of which extends substantially orthogonally to the adjustment axis of the adjusting element and approximately tangentially to an outer tube of the drive unit.

Alternatively, the pivot axis of one connecting unit may intersect the adjustment axis of the adjusting element. This may be the case in particular if one connecting unit is formed by a connecting unit that is arranged on one or both sides of an outer tube of the drive unit, the pivot axis of which connecting unit is oriented substantially radially to the outer tube of the drive unit.

The adjusting device may be a spindle drive, for example.

Alternatively, the adjusting device may of course also be a hydraulically and/or pneumatically operated drive.

Advantageously, one connecting unit may be integrally bonded to the drive assembly, for example welded or bonded, or be formed in one piece therewith. In this way, additional connecting elements may be dispensed with, and therefore the required installation space and the cost of the adjusting device according to the invention can be further reduced. In particular, an integral design of one connecting unit together with the drive assembly can reduce or completely prevent a deformation of the drive assembly and thus complications, for example positioning inaccuracies or increased wear.

According to another aspect, the invention relates to the use of an adjusting device according to the invention for adjusting a movable vehicle part, in particular a vehicle door or a vehicle panel, relative to the body of the vehicle.

The invention will be explained in greater detail in the following, by way of embodiments and with reference to the accompanying drawings, in which.

Figure 1:
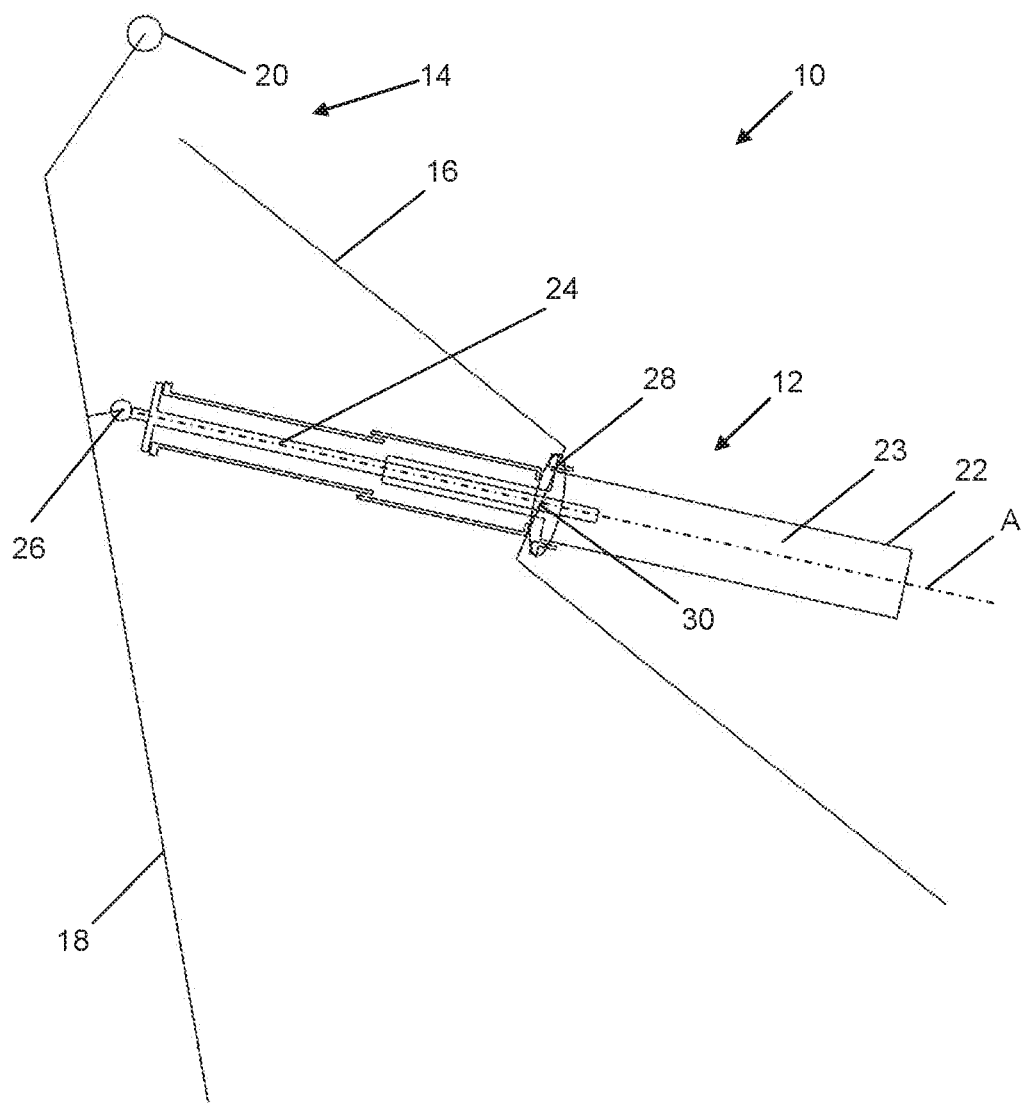
FIG. 1 is a schematic sectional view of an adjusting device according to the invention in an extended position.

FIG. 1 shows an arrangement 10 of an adjusting device 12 on a superordinate assembly 14. In the present schematic depiction, the superordinate assembly 14 comprises a main element 16, for example a vehicle body, and an element 18 that moves relative to the main element 16, for example a tailgate of a vehicle. The moving element 18 is connected to the main element 16 by a joint 20.

The adjusting device 12 comprises a drive assembly 22 having a drive unit 23 (not shown) and an adjusting element 24. The adjusting element 24 can be displaced axially, relative to the drive assembly 22, along an adjusting axis A by means of the drive unit 23, such that a free end of the adjusting element 24 can be displaced away from or towards the drive assembly 22. The adjusting device 12 may, for example, be in the form of a spindle drive, the drive assembly 22 comprising a drive unit 23 that is formed as an electric motor, and a spindle nut, and the adjusting element 24 comprising a spindle. Depending on the direction of rotation of the spindle nut, the spindle that is in threaded engagement with the spindle nut, i.e. the adjusting element 24, is displaced out of or into the drive assembly 22, and therefore the entire length of the adjusting device 12 increases or decreases correspondingly.

The adjusting element 24 is connected, at the free end thereof, to the moving element 18 by a joint connection 26, e.g. a ball joint.

The drive assembly 22 comprises a connecting unit 28 at the end thereof at which the adjusting element 24 emerges from the drive assembly 22 or at which the adjusting element 24 leaves the drive assembly 22. The connecting unit 28 is connected to the main element 16 of the superordinate assembly 14 such that a pivoting movement of the drive assembly 22, i.e. of the adjusting element 22, about a pivot axis 30 relative to the main element 16 is permitted.

In FIG. 1, the adjusting device 12 is shown at its maximum length, such that the moving element 18 is pivoted out as far as possible relative to the main element 16.

Figure 2:
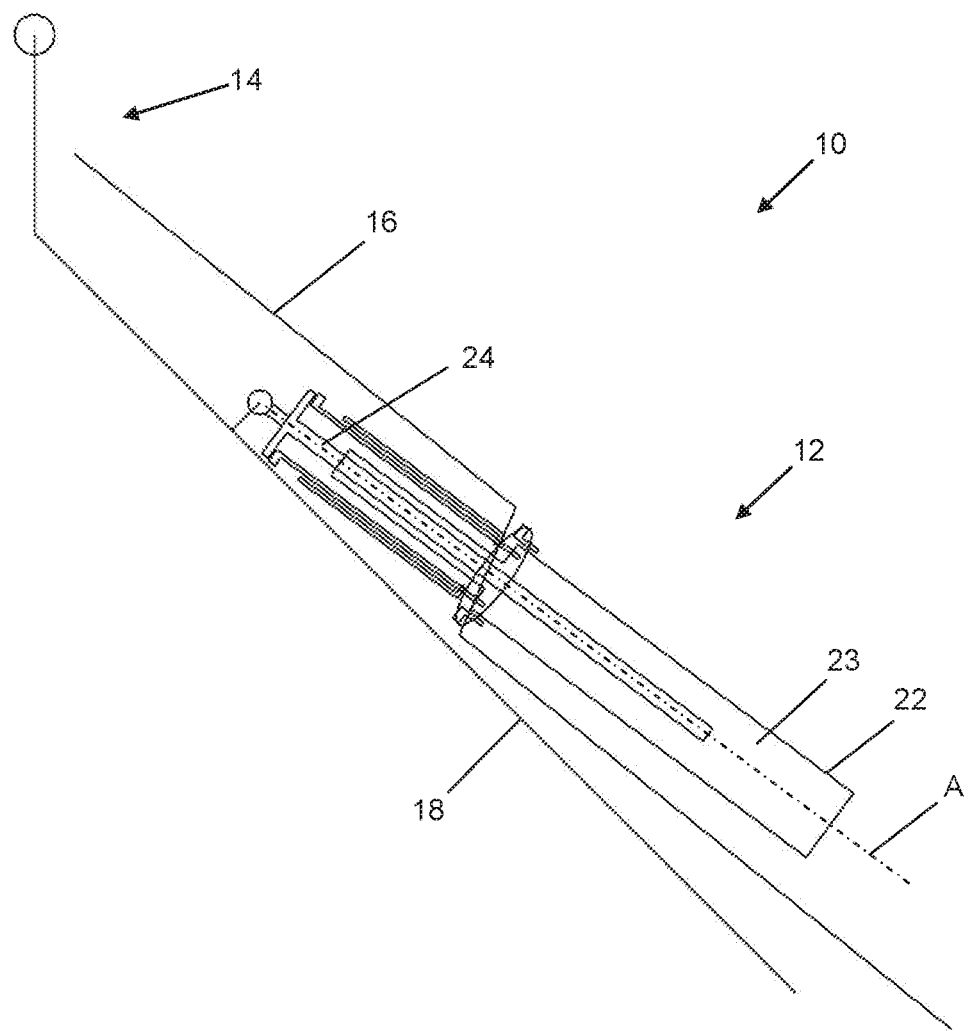
FIG. 2 is a schematic sectional view of the adjusting device of FIG. 1 in a retracted position.

In FIG. 2, the adjusting device 12 is shown in a state in which it is at its minimum length, i.e. the adjusting element 24 is retracted as far as possible into the drive assembly 22. The moving element 18 is thus displaced relative to the main element 16 so as to be as close thereto as possible.

The adjusting device 12 may have a locking or even self-locking property, so that it is not possible for the moving element 18 to be displaced relative to the main element 16 without operating the adjusting element 12, i.e. the drive assembly 22, or it is only possible with great effort.

The adjusting device 12 may also comprise a force-limiting coupling and/or brakes etc., in a manner known per se.

Figure 3:
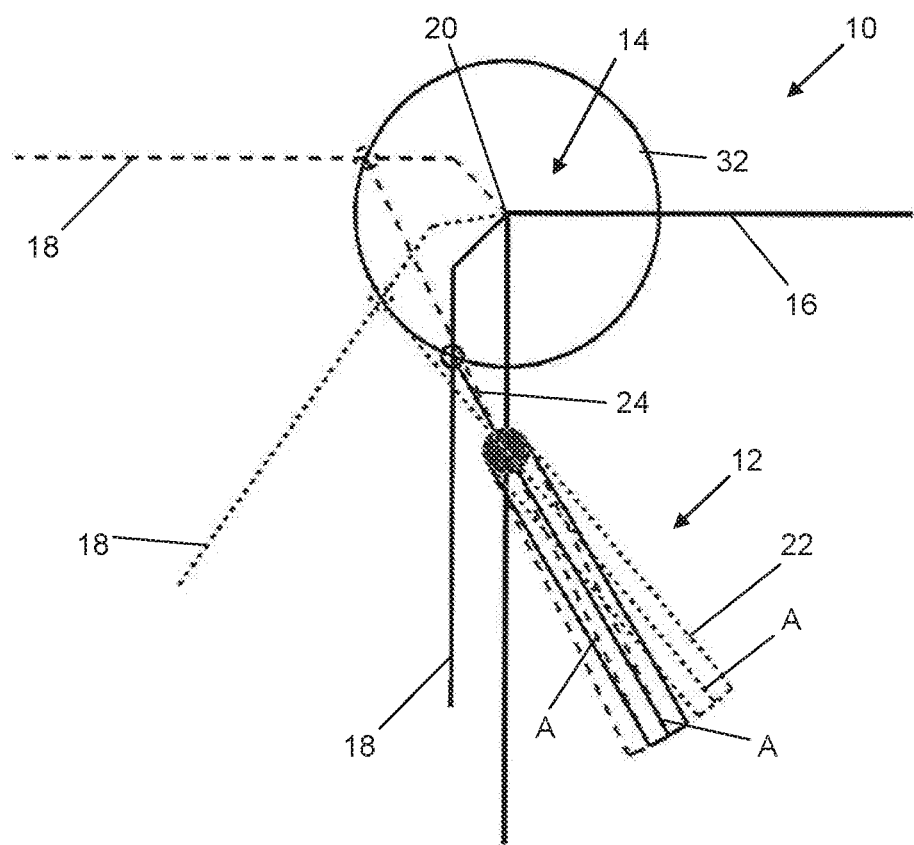
FIG. 3 is a schematic view of a movement path of the adjusting device of FIGS. 1 and 2.

FIG. 3 shows the arrangement 10 in the two maximum positions, from FIG. 1 and FIG. 2, of the adjusting device 12 and of the superordinate assembly 14, and in an intermediate position.

Proceeding from the maximum open position of the moving element 18 relative to the main element 16 (see dashed line) shown in FIG. 1, the adjusting element 24 is also in a position extended as far as possible out of the drive assembly 22.

In this case, the orientation of the adjusting device 12 follows a straight line which passes through the two pivot axes of the relevant connecting units 26 and 28 or 30 (see adjusting device 12, shown dashed).

The moving element 18 is displaced into the closed position thereof (see solid line) via an intermediate position, shown dotted in FIG. 3, of the moving element 18 and the adjusting device 12, with which closed position the orientation, shown by solid lines, of the adjusting device 12 is associated.

As shown in FIG. 3, the joint connection 26 follows a circular path 32 which has the joint 20 as the centre point and a radius that corresponds to the distance between the joint connection 26 and the joint 20.

Figure 4:
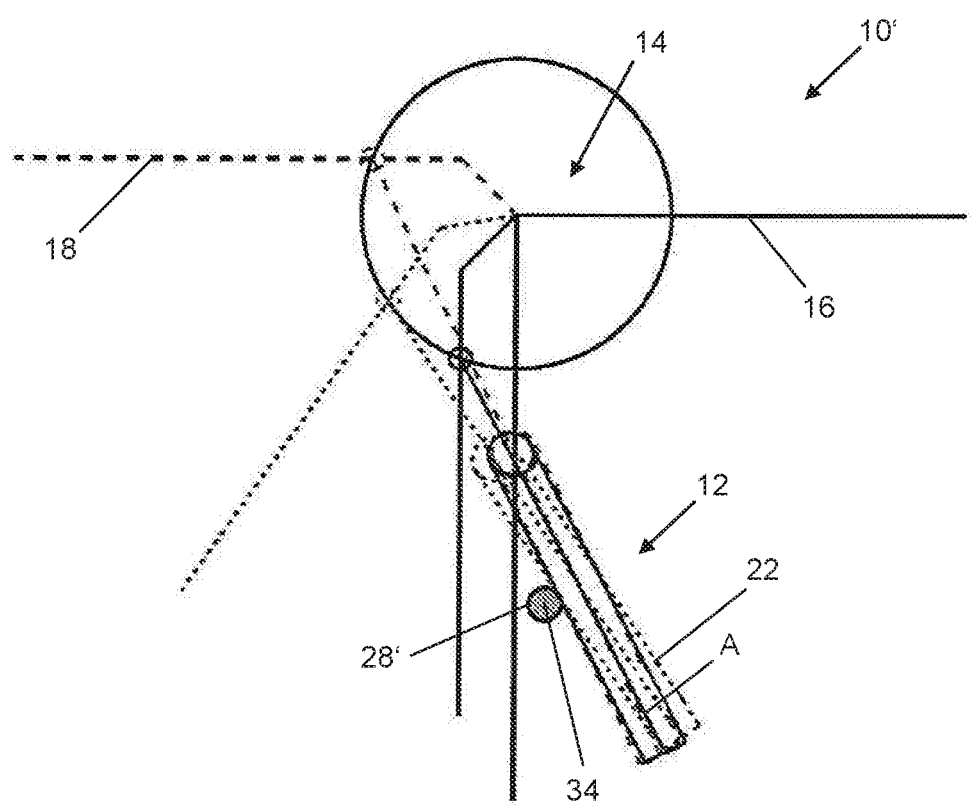
FIG. 4 is a schematic view of a movement path of an adjusting device according to the invention having a connecting unit that is arranged centrally on the drive assembly.

FIG. 4 is a depiction, analogous to FIG. 3, of an arrangement 10', which differs from the arrangement 10 merely in the position of the connecting unit 28' relative to the drive assembly 22, and therefore the description of the arrangement 10 can be referred to when describing the arrangement 10'. Analogous parts of the arrangement 10' are provided with the same reference numerals as those of the arrangement 10.

In the example shown in FIG. 4, the connecting unit 28' is arranged approximately in the centre of the length of the drive assembly 22. The connecting unit 28' is arranged on a side of the drive assembly 22 such that the adjusting device 12 comprises a pivot axis 34 relative to the main element 16, which axis extends substantially perpendicularly and skewed relative to the adjustment axis A of the adjusting element 24. In the example shown in FIG. 4, the pivot axis 34 furthermore extends perpendicularly to the plane of the sheet.

The arrangement, shown in FIG. 4, of the adjusting device 12 on the superordinate assembly 14 results in less displacement of the free end of the drive assembly 22 during displacement of the moving element 18 relative to the main element 16.

It should be added that at least one of the two connecting units may be designed as a sliding connection in the form of a "pin and socket", it being possible to freely select which of the pin and socket should be fastened to the drive assembly 22. Of course, at least one of the two connecting units may also comprise a ball bearing, rolling bearing or another conceivable bearing.

The invention claimed is:

1. Adjusting device for a vehicle part that is movable relative to a body of a vehicle about a joint, comprising
   a drive assembly comprising a drive unit and a connecting unit which is configured to directly connect the drive assembly to the body of the vehicle, and
   an adjusting element, which can be displaced along an adjustment axis relative to the drive assembly by the drive unit and which comprises, at a free end thereof, an additional connecting unit which is configured to directly connect the adjusting element to the vehicle part,
   wherein the connecting unit is connected to the drive assembly at a point that is remote from a free end of the drive assembly,
   wherein a pivot axis of the connecting unit, around which the drive assembly is pivotable relative to the body of the vehicle, extends so as to be skewed relative to and not intersecting with the adjustment axis of the adjusting element,
   wherein the connecting unit is arranged at an end of the drive assembly opposite the free end at which the drive assembly interacts with the adjusting element, the adjusting element is extended outwardly away from the drive assembly at the location of the connecting unit,
   wherein as the vehicle part moves between an open position and a closed position relative to the body of the vehicle the additional connecting unit follows a circular path which has the joint as a center point and a radius that corresponds to a distance between the additional connecting unit and the joint.

2. Adjusting device according to claim 1, wherein the adjusting device is formed as a spindle drive.

3. Adjusting device according to claim 1, wherein the connecting unit is integrally connected to the drive assembly or is formed in one piece therewith.

4. Use of an adjusting device according to claim 1 for adjusting the movable vehicle part relative to the body of the vehicle.

5. Adjusting device according to claim 3, wherein the connecting unit is welded or bonded to the drive assembly.

6. Use of an adjusting device according to claim 4, wherein the movable vehicle part is a vehicle door or a vehicle panel.

7. Adjusting device according to claim 1, wherein the pivot axis of the connecting unit extends approximately tangentially to an outer tube of the drive unit.

* * * * *